United States Patent [19]

Sampson

[11] Patent Number: 4,919,387

[45] Date of Patent: Apr. 24, 1990

[54] TILT AND SWIVEL SUPPORT APPARATUS

[75] Inventor: Craig F. Sampson, Palo Alto, Calif.

[73] Assignee: Bell & Howell Publication Systems Company, Skokie, Ill.

[21] Appl. No.: 319,528

[22] Filed: Mar. 6, 1989

[51] Int. Cl.⁵ ............................................. F16M 13/00
[52] U.S. Cl. ..................................... 248/921; 248/371;
 248/349
[58] Field of Search ..................... 248/278, 280.1, 349, 248/371, 372.1, 397, 917–924

[56] References Cited

U.S. PATENT DOCUMENTS

| | | |
|---|---|---|
| 2,543,352 | 2/1951 | Brown . |
| 3,462,112 | 8/1969 | Vom Brack et al. ............... 248/349 |
| 3,908,942 | 9/1975 | Keith et al. . |
| 3,936,026 | 2/1976 | Hampel et al. . |
| 4,047,759 | 9/1977 | Koscinski ......................... 248/587 X |
| 4,074,656 | 2/1978 | Haapala . |
| 4,365,779 | 12/1982 | Bates et al. . |
| 4,395,010 | 7/1983 | Helgeland et al. . |
| 4,410,159 | 10/1983 | McVicker et al. . |
| 4,415,136 | 11/1983 | Knoll . |
| 4,437,638 | 3/1984 | Scheibenpfug . |
| 4,453,687 | 6/1984 | Sweere . |
| 4,453,689 | 6/1984 | Ellis et al. . |
| 4,474,352 | 10/1984 | Nishi . |
| 4,515,086 | 5/1985 | Kwiecinski et al. . |
| 4,542,872 | 9/1985 | Marino et al. . |
| 4,549,714 | 10/1985 | Busch ................................. 248/349 |
| 4,555,081 | 11/1985 | Ermanski . |
| 4,589,713 | 5/1986 | Pfuhl et al. ...................... 248/349 X |
| 4,591,123 | 5/1986 | Bradshaw et al. .................. 248/349 |
| 4,605,188 | 8/1986 | Goetz ............................. 248/1 E X |
| 4,616,218 | 10/1986 | Bailey et al. ..................... 248/1 E X |
| 4,624,434 | 11/1986 | Lake, Jr. et al. ................ 248/1 I X |
| 4,635,894 | 1/1987 | Sammons . |
| 4,640,485 | 2/1987 | Day et al. . |
| 4,648,574 | 3/1987 | Grenlund . |
| 4,666,121 | 5/1987 | Choong et al. .............. 248/372.1 X |
| 4,687,167 | 8/1987 | Skalka et al. . |
| 4,691,886 | 9/1987 | Wendlung et al. . |

FOREIGN PATENT DOCUMENTS

2847135 10/1978 Fed. Rep. of Germany .

Primary Examiner—Ramon O. Ramirez
Assistant Examiner—Robert A. Olson
Attorney, Agent, or Firm—David Weiss

[57] ABSTRACT

Support apparatus for easily and independently adjusting tilt and swivel of a supported product, specifically a visual display device such as a computer monitor. The swivel mechanism permits the display device to be swivelled through a rotational angle greater than 360°, or greater than 180° in each direction from a front reference position. The tilt mechanism utilizes a stack of elongate torsion springs or bars with the stack's midportion fixed against longitudinal rotation and with its ends rotatable, including means for providing resistance to such rotation, for counter-balancing the torque produced by the display device in its various tilt positions.

66 Claims, 7 Drawing Sheets

TILT AND SWIVEL SUPPORT APPARATUS

BACKGROUND OF THE INVENTION

This invention relates to tilt and swivel apparatus for supporting a product, and more particularly to apparatus for adjusting tilt position of a display device screen and for adjusting swivel position of the display device screen through a rotational angle which may be greater than 360°.

Display devices, such as video displays for computer terminals, are preferably mounted in such manner for permitting the display screen to be conveniently tilted toward or away from its support base and swivelled sidewise about a vertical axis. The need for such tilt and swivel adjustments typically arises from considerations of operator comfort and health, including the avoidance of glare and for diminishing operator fatigue, particularly when the operator is seated at the terminal display screen for extended periods of time.

In some applications it is desirable that the terminal may be utilized by an operator who is either seated or standing, with the display at either desk height or counter height. Although the terminal may be dedicated to use by a single operator during extended periods of time, it may also be used by the operator on an occasional basis, or by a number of different operators either together or separately from time to time. Examples of such terminals include computer-based reference systems, and in particular image database retrieval systems such as electronic catalog systems, such as systems permitting automobile dealers access to illustrated parts lists for rapid retrieval of replacement parts information, as well as systems for retrieving catalogued mechanical service information and schematic diagrams.

In addition to the previously mentioned advantages resulting from providing tilt and swivel features for such displays, it is desirable that the display screens of such terminals be easily adjustable independently for tilt and swivel to accommodate the different operators. It is further desirable that the terminal be accessible from all sides, particularly when positioned on a table accessible from all sides or on a counter accessible from both sides, and in such situations the display screen should be capable of being swivelled through a rotation of at least 360°.

SUMMARY OF THE INVENTION

The present invention provides support apparatus for easily and independently adjusting tilt and swivel of a supported product, specifically a visual display device such as a video monitor having a display screen. The apparatus permits the display device to be swivelled through an angle greater than 360° so that the screen may be viewed from all sides. The display device may be supported in cantilever fashion such as along its front bottom edge, which configuration increases the ease with which the device's tilt and swivel positions may be changed. Such cantilever configuration, in addition, adapts itself to new possibilities in terminal aesthetic design.

Broadly described, the support apparatus for adjustably tilting and swivelling a product, and specifically a display device having a display screen, comprises in combination: a base; a swivel member supported by the base rotatably about a vertical axis of rotation and having arcuate means extending through a rotational angle about the vertical axis; a bearing member interposed between the base and the swivel member and rotatable with respect to the base about the vertical axis, the bearing member including means cooperating with the arcuate means and the base such that the swivel member is rotatable with respect to the bearing member through a first predetermined angle about the vertical axis and the bearing member is rotatable with the swivel member upon rotation of the swivel member through a second predetermined angle about the vertical axis, for permitting the swivel member to be rotated with respect to the base about the vertical axis through a rotational angle equal to the sum of the first and second predetermined angles; elongate torsion spring means having a longitudinal axis and means securing a portion of the spring means to the swivel member with the longitudinal axis horizontally extending and for preventing rotation with respect to the swivel member of said portion about the longitudinal axis, said portion being approximately mid-length the torsion spring means; coupling means coupled to the swivel member and to the ends of the spring means, the coupling means being rotatable about the longitudinal axis with said ends rotating about the longitudinal axis in response to rotation of the coupling means; mounting means for mounting the display device to the coupling means, preferably with the plane of the display screen parallel to the torsion spring means longitudinal axis, such that externally urging the mounted display device to rotate about said longitudinal axis for changing tilt position of the display device will cause the coupling means to correspondingly rotate about said longitudinal axis, and externally urging the mounted display device to rotate about the vertical axis for changing swivel position of the display device will cause the swivel member to correspondingly rotate about the vertical axis; resistance means cooperating with the coupling means for providing resistance in the coupling means to rotation about said longitudinal axis; and stop means cooperating with the coupling means and the swivel member for limiting rotation of the coupling means, and therefore the torsion spring means ends, in each direction about said longitudinal axis.

The display device and its mounting means are counterbalanced by the torsion spring means, and the rotational resistance provided by the resistance means assures that each counterbalanced position is maintained until the mounted display device is externally urged sufficiently to overcome such resistance for changing tilt position of the display device.

In the preferred embodiment of apparatus according to the present invention, the first and second predetermined rotational angles are such that their sum is at least 360°, and more specifically the second predetermined angle is less than 360° while the first predetermined angle is at least equal to the difference between 360° and the second predetermined angle.

The swivel function of the apparatus of the present invention is implemented by the combination of the base, the swivel member, and the interposed bearing member interacting with the swivel member and the base. The swivel member and the bearing member are rotatable with respect to the base in both clockwise direction and counterclockwise direction about the vertical axis. The bearing member includes stop means for cooperating with stop means on the base for stopping clockwise rotatability of the bearing member when the bearing member has been rotated clockwise through the second predetermined angle, and for stopping counterclockwise rotatability of the bearing member when the bearing member has been rotated counterclockwise through the second predetermined angle. The bearing member stop means further cooperates with means engaging the swivel member arcuate means, for stopping clockwise rotatability of the swivel member when the swivel member has been rotated clockwise through the sum of the first and second predetermined angles and for stopping counterclockwise rotatability of the swivel member when the swivel member has been rotated counterclockwise through the sum of the first and second predetermined angles.

The tilt feature of the apparatus of the present invention is implemented by the elongate torsion spring means, the coupling means, the resistance means for providing resistance in the coupling means to rotation about the longitudinal axis, and the stop means for limiting rotation of the coupling means. The elongate torsion spring means preferably includes a plurality of stacked elongate torsion spring members of substantially equal lengths, equal widths and equal depths or thicknesses.

The coupling means includes cylinder means for housing respective portions of the elongate torsion spring means in the vicinity of the spring ends longitudinally within the cylinder means, the cylinder means coupled rotatably about its axis to the swivel member and including means securing thereto the spring means in the vicinity of the spring ends. In the preferred embodiment of the tilt apparatus according to the present invention, the coupling means includes a first hollow cylinder extending from the vicinity of the secured mid-portions of the stacked spring members to the vicinity of one end of the spring member stack, and a second hollow cylinder extending from the vicinity of the secured mid-portions of the stacked spring members to the vicinity of the other end of the spring member stack, with the stop means projecting from the swivel member for engaging cooperating stop means along the obverse ends of the cylinders. The resistance means for providing rotational resistance includes friction means for impeding rotation of both cylinders, and specifically respective bushings about each cylinder and resilient clamping means secured to the swivel member for resiliently clamping the bushings against their respective cylinders.

The swivel feature of the present invention may be implemented without the tilt feature, and the tilt feature may be implemented without the swivel feature. In the latter case, of course, there would be no need for the swivel member, and in such configuration the coupling means of the tilt apparatus would be rotatably coupled to the base, with the mid-portion of the elongate torsion spring means secured to the base as well.

BRIEF DESCRIPTION OF THE DRAWINGS

The novel features which are believed characteristic of the invention, together with further advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figure 1:
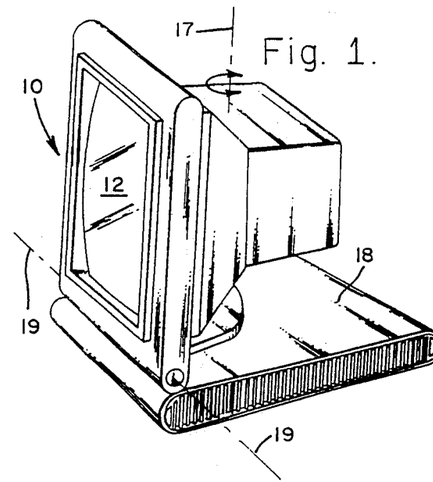
FIG. 1 is a perspective view of a video display supported for tilt and swivel according to a preferred embodiment of the present invention.

Turning first to FIG. 1, there is shown a cathode ray tube (CRT) display device 10 having a display screen 12. In the illustrated embodiment, the CRT device 10 is mounted to a frame 14 (shown in FIG. 3) which may be secured within a housing 16. The CRT/frame 10, 14 is supported for swivel about a vertical axis 17 and for tilt about a horizontal axis 19, upon a base 18 typically placed upon a suitable surface such as a desk or countertop. In addition to its support function, the base 18 may house microprocessor circuitry for a computer work station of which the CRT device 10 is the information display device or monitor.

Figure 2:
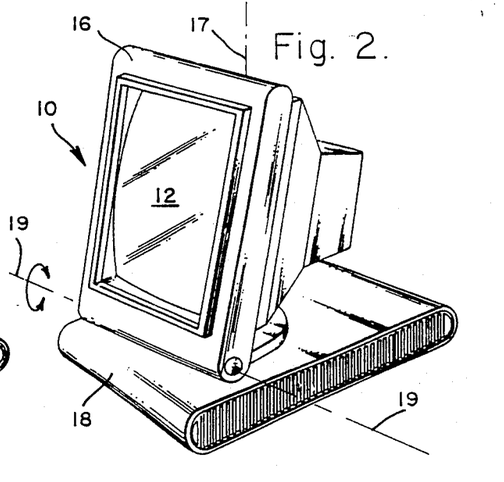
FIG. 2 is a perspective view of the supported video display or FIG. 1, shown in a tilt and swivel position different than that shown in FIG. 1.

The CRT device 10 is shown in its "normal" position in FIG. 1, i.e. with the screen 12 substantially vertical and facing the operator when the operator is positioned at the front 20 of the base 18. The CRT device 10 is shown in FIG. 2 with its swivel position (i.e. the CRT screen's rotational angular displacement about the vertical axis 17 from the screen's normal front-facing position) as well as its tilt position (i.e. the screen's rotational angular displacement about the horizontal axis 19 from the screen's normal vertical position) changed from the position shown in FIG. 1. Such changes in position are accomplished by manually urging the CRT's housing/frame 16, 14 in the appropriate direction.

Figure 4:
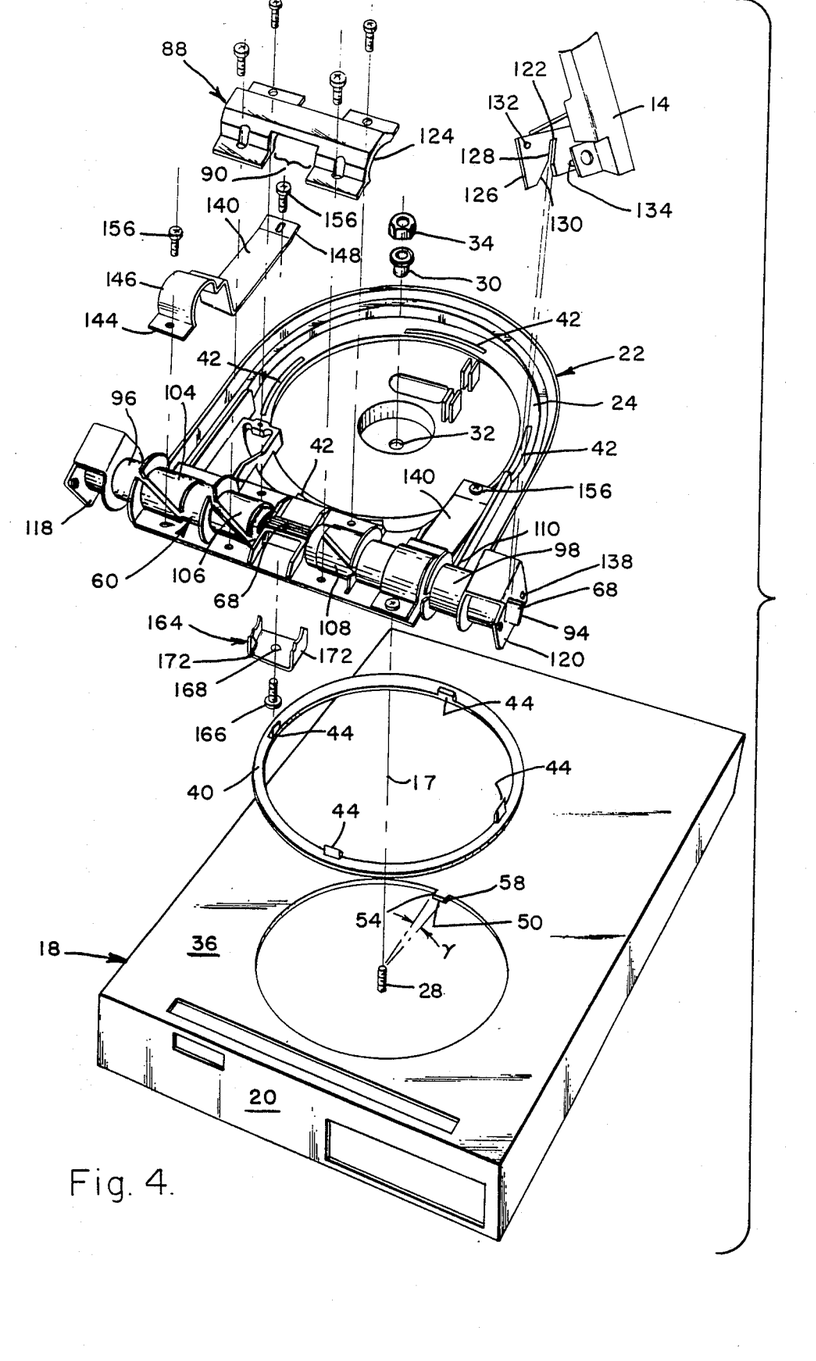
FIG. 4 is an exploded view of the tilt and swivel support structure of the preferred embodiment of the present invention.
Figure 7:
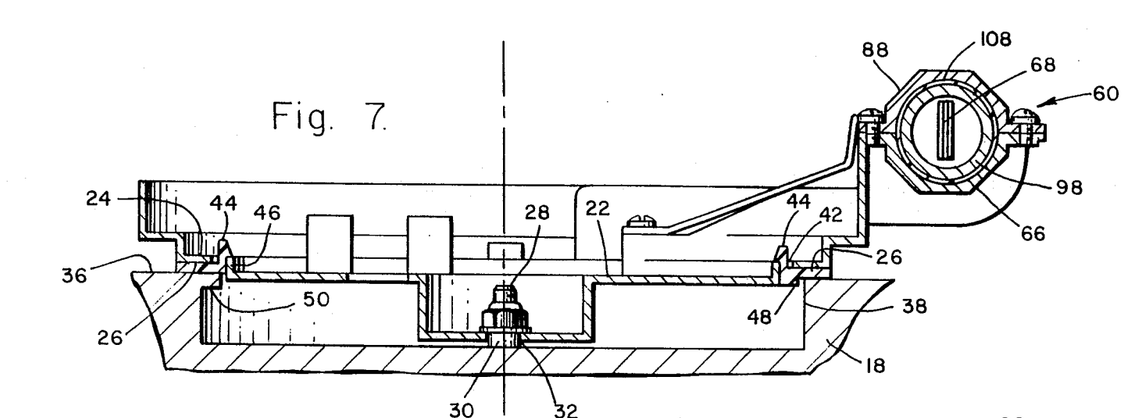
FIG. 7 is a cross-sectional view of the swivel member and tilt mechanism of FIG. 5 taken along the line 7—7 in the direction of the appended arrows, also including the bearing ring attached to the swivel member and the combination mounted to the base.

Turning next to FIG. 4, the invention includes a swivel member 22 having an annular portion 24 with a flat under surface 26. See also FIGS. 5 and 7. As best seen in FIG. 7, the swivel member 22 is rotatable with respect to the base 18 about the vertical axis 17. A threaded center post 28 projects from the base 18 along the vertical axis 17, about which there is a collar 30 which fits within an aperture 32 in the swivel member 22 at the rotational center of the annular portion 24. The swivel member is rotatably secured about the center post 28 and collar 30 by means of a locknut 34 retaining the collar 30 in place, with the swivel member annular portion's flat under surface 26 resting upon a bearing ring 40 (to be described later) which in turn rests upon the upper surface 36 of the base 18 about the periphery of an annular aperture 38 in the base upper surface 36. The diameter of the base aperture 38 is greater than the inner diameter of the swivel member annular portion 24 but less than the outer diameter of the annular portion 24.

The annular portion 24 of the swivel member 22 contains at least one, and preferably four, arcuate slots 42 having a common center with the inner and outer circumferences of the annular portion 24. In the preferred embodiment, each slot 42 extends through an angle or arc $\alpha$ about the vertical axis 17 and the slots 42 are equally spaced along the swivel member's flat annular portion 24. In one example, the arcuate slots 42 each extend through an arc $\alpha$ of 40°, and the four slots 42 are spaced 90° apart on centers.

A substantially flat bearing ring 40 having substantially the same inner and outer diameters as the swivel member annular portion's flat under surface 26, is situated between and in contact with the swivel member annular portion flat under surface 26 and the flat upper surface 36 of the base 18 about the aperture 38. The lower surface of the bearing ring 40 is slideable with respect to the base upper surface 36 and the swivel member annular portion under surface is slideable with respect to the upper surface of the bearing ring 40. In the preferred embodiment, the bearing ring 40 is made of a lubricated material, for example a Teflon and/or silicone impregnated polycarbonate material such as marketed by LNP Inc. under the designation DL4530.

Figure 14:
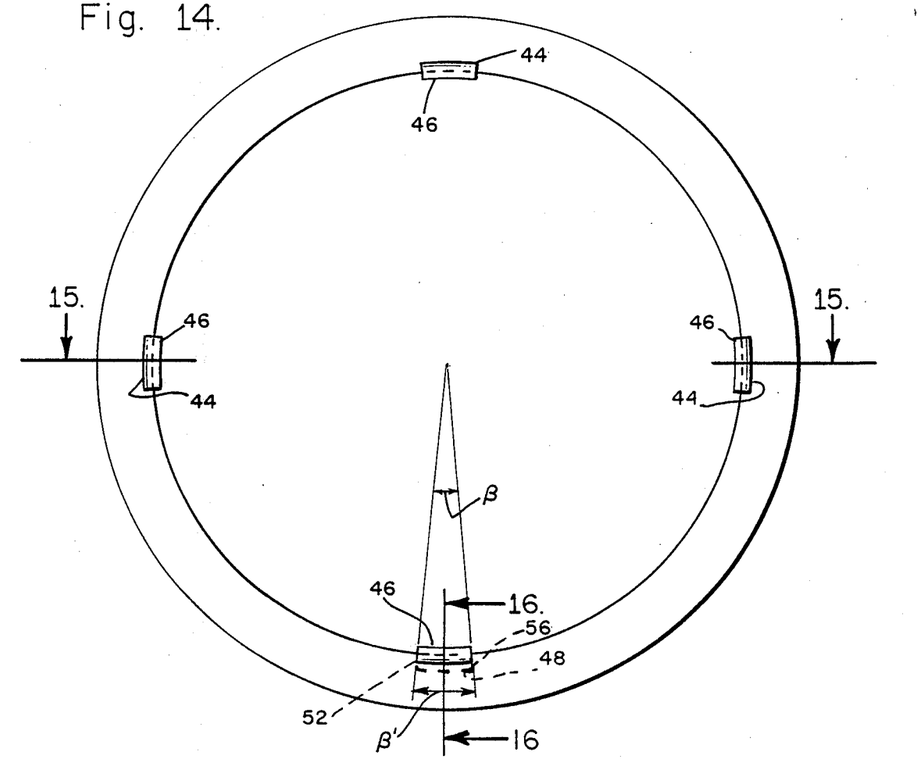
FIG. 14 is a top plan view of the bearing ring of the swivel apparatus of the preferred embodiment of the present invention.
Figure 15:
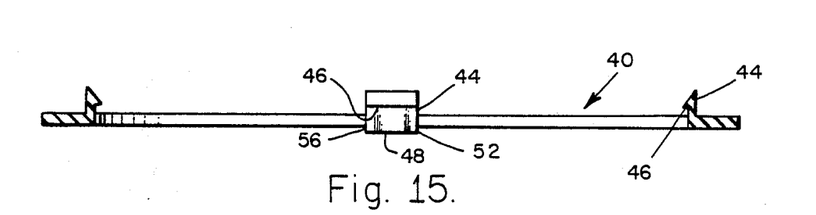
FIG. 15 is a cross-sectional view of the bearing ring of the FIG. 14 taken along the line 15—15 in the direction of the appended arrows.
Figure 16:
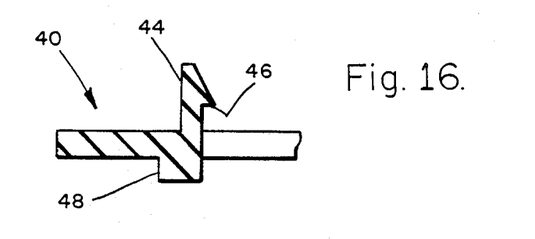
FIG. 16 is a cross-sectional view of the bearing ring of FIG. 14 taken along the line 16—16 in the direction of the appended arrows.

Turning to FIGS. 14, 15 and 16, the preferred bearing ring 40 includes four snap fingers 44—one for each arcuate slot 42 of the swivel member 22—upwardly projecting from the bearing ring 40 at its inner circumference and terminating with an inwardly extending portion or catch 46. The snap fingers 44 are spaced along the bearing ring 40 for projecting through the respective arcuate slots 42 and for being slideably retained by the swivel member 22 along the respective arcuate slots 42. The snap fingers 44 each extend along an arc $\beta$ having a common center with that of the bearing ring 40 and therefore of the arcuate slots 42. In one example, the arc $\beta$ of each snap finger 44 is 7.5°, and the snap fingers 44 are equally spaced 90° apart on centers. The snap fingers 44 are sufficiently resilient such that they may be radially urged outwardly when the ring 40 is being installed on the swivel member 22, and after passing through the arcuate slots 42 the snap fingers 44 snap radially inwardly with their inwardly extending portions 46 engaging the upper surface of the swivel member annular portion 24 along the inner arc of the respective slots 42.

A stop 48 depends from the bearing ring 40 in the vicinity of the bearing ring's inner circumference, and extends along an arc $\beta'$ having a common center with the bearing ring 40. It is preferred that the stop 48 extend downwardly from one of the snap fingers 44 and that its arc $\beta'$ is the same as the arc $\beta$ of the snap finger 44, as indicated in FIGS. 14–16, so that in the example the bearing ring stop arc $\beta'$ is 7.5°.

An additional stop 50 projects radially inwardly from the upper surface 36 of the base 18 and into the aperture 38, as shown in FIGS. 4 and 7, extending along an arc $\gamma$ having its center along the vertical axis 17. When the bearing ring 40 is urged to rotate upon the stationary base upper surface 36 about the vertical axis 17 in a clockwise direction, clockwise rotatability of the bearing ring 40 is stopped when the clockwise leading end 52 of the bearing ring stop 48 contacts the left (as viewed in the drawings) radial side 54 of the base stop 50. Similarly, when the bearing ring 40 is urged to rotate counterclockwise about the vertical axis 17, counterclockwise rotatability of the bearing ring 40 is stopped when the counterclockwise leading end 56 of the bearing ring stop 48 contacts the other or right (as viewed in the drawings) radial side 58 of the base stop 50. It can be readily appreciated that the bearing ring 40 is rotatable with respect to the base 18, in the clockwise direction about the vertical axis 17, and in the counterclockwise direction about the vertical axis 17, through a rotational angle equal to 360° less the sum of the arcs $\beta'$, $\gamma$ of the bearing ring stop 48 and the base stop 50. Accordingly, in the example where the arc $\beta$ of the bearing ring stop 48 is 7.5° and the arc $\gamma$ of the base stop 50 is 5°, the bearing ring 40 is rotatable in either clockwise or counterclockwise direction about the vertical axis 17 through a total rotational angle of 347.5°.

It can be further appreciated that the swivel member 22 is rotatable with respect to the bearing ring 40, in either clockwise or counterclockwise direction about the vertical axis 17, by a rotational angle equal to the arc $\alpha$ of an arcuate slot 42 less the arc $\beta$ of a bearing ring snap finger 44. In the example where the arc α of each slot 42 is 40° and the arc β of each snap finger 44 is 7.5°, the swivel member 22 will be rotatable with respect to the bearing ring 40 in either clockwise or counterclockwise direction about the vertical axis 17, through a rotational angle of 32.5°.

Swivel operation of the swivel member 22 with respect to the base 18 is illustrated in FIGS. 17a–h where, for clarity of discussion, only the snap finger 44 from which depends the stop 48 is indicated, it being understood that in the preferred embodiment the remaining three snap fingers 44 cooperate with their respective arcuate slots 42 in similar manner to the shown snap finger 44 within its slot 42. In the preferred apparatus according to the present invention, the CRT display device 10 is mounted to a frame 14 (see FIGS. 1–3), which in turn is mounted to a tilt mechanism 60 (to be described later) secured to the swivel member 22 for rotation about the center post 28 aligned with the vertical axis 17. The display screen 12 is substantially parallel to the longitudinal axis of the tilt mechanism 60, and the position of the tilt mechanism 60 in FIG. 17a may be considered to correspond to the "normal" swivel position of the display screen 12 as shown in FIG. 1, with the front 20 of the base 18 shown at the bottom of each of FIGS. 17a–h.

Figure 17A:
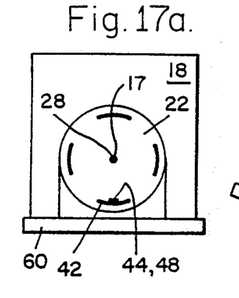
FIGS. 17a–h are a series of diagrammatic plan views of the swivel member of the present invention, indicating position of the bearing member with respect to the swivel member as the swivel member is swivelled through the limits of angular rotatability.

In the "normal" swivel position of the swivel member 22, shown in FIG. 17a, one of the arcuate slots 42 is symmetrically situated toward the front 20 of the base 18, and the snap finger 44 from which the bearing ring stop 48 depends is situated within such front most slot 42. The base stop 50 is positioned toward the rear of the base 18, as shown in FIGS. 4 and 7.

Figures 17B, 17C:
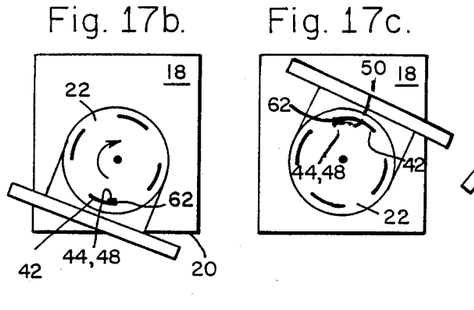

As the swivel member 22 is manually rotated in a clockwise direction as shown in FIG. 17b, the annular portion 24 of the swivel member 22 slides over the stationary bearing ring 40 until the clockwise trailing end 62 of the slot 42 contacts the snap finger 44, whereupon continued clockwise rotation of the swivel member 22 causes the bearing ring 40 to rotate along with the swivel member 22 until such time when the clockwise leading end of the bearing ring stop 48 depending from this snap finger 44 contacts the base stop 50 located toward the rear of the base 18, stopping further clockwise rotatability of the bearing ring 40. Since the clockwise trailing end 62 of the arcuate slot 42 is in contact with the snap finger 44, as shown in FIG. 17c, continued clockwise rotatability of the swivel member 22 is precluded.

Figure 17D:
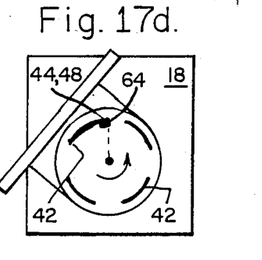
Figure 17E:
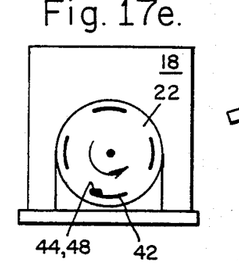

At this point, upon manually urging the swivel member 22 in a counterclockwise direction, counterclockwise rotation of the swivel member 22 proceeds with respect to the now stationary bearing ring 40 until the counterclockwise trailing end 64 of the arcuate slot 42 contacts the snap finger 44, a condition shown in FIG. 17d. This condition is maintained during continued counterclockwise urging of the swivel member 22, causing the bearing ring 40 to rotate counterclockwise along with counterclockwise rotation of the swivel member 22 (see, for example, FIG. 17e), until the counterclockwise leading end of the bearing ring stop 48 contacts the base stop 50 located toward the rear of the base 18, indicated in FIG. 17f, stopping continued counterclockwise rotatability of the bearing ring 40. Since the snap finger 44 is contacted by the counterclockwise trailing end 64 of the slot 44 while counterclockwise rotatability of the bearing ring 40 is prevented, further counterclockwise rotatability of the swivel member 22 with respect to the base 18 is also prevented.

Figures 17F, 17G:
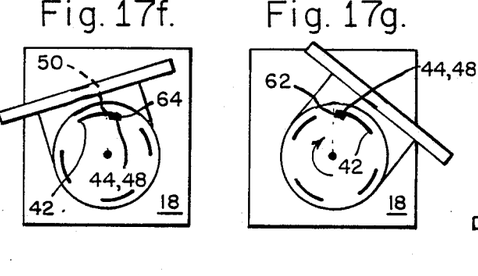
Figure 17H:
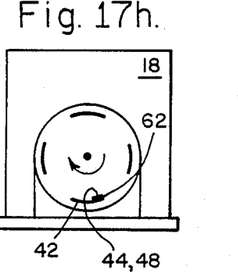

The swivel member 22 may now be urged in a clockwise direction as indicated in FIG. 17g, whereupon the swivel member 22 is caused to rotate with respect to the stationary bearing ring 40 until the clockwise trailing end 62 of the slot 42 contacts the snap finger 44. With continued clockwise urging of the swivel member 22, the rotating swivel member 22 causes the bearing ring 40 to correspondingly rotate (see, for example, FIG. 17h) until rotatability of both the bearing ring 40 and the swivel member 22 is stopped as described above with respect to FIGS. 17b and c.

By means of the swivel apparatus of the present invention, the swivel member 22 may be rotated with respect to the base 18, in either clockwise or counterclockwise direction about the vertical axis 17, through a total rotational angle equal to the sum of the rotational angle through which the bearing ring 40 is rotatable with respect to the base 18 and the rotational angle through which the swivel member 22 is rotatable in the same direction with respect to the bearing ring 40. When rotatability of the swivel member 22 is referenced from its "normal" position as shown in FIG. 17a, the swivel member 22 may be swivelled from its normal position to its maximum clockwise position which is one-half the total clockwise rotational angle described in the previous sentence, and from its normal position to its maximum counterclockwise position which is one-half the total counterclockwise rotational angle described in the previous sentence.

In the example discussed above, wherein the snap fingers 44 and the bearing ring stop 48 each extend through a 7.5° arc β,β', the base stop 50 extends through a 5° arc γ and the slots 42 each extend through a 40° arc α, it can be appreciated that the swivel member is rotatable through a total rotational angle of 380°, in either the clockwise or counterclockwise directions. When referenced from the swivel member's "normal" position as illustrated in FIG. 17a, the swivel member's maximum swivel positions are 190° in each direction.

Referring to FIGS. 3, 4, 5 and 7, the tilt mechanism 60 of the present invention is secured to the swivel member 22 such that the tilt mechanism 60 is caused to rotate about the vertical axis 17 in correspondence to rotation by the swivel member 22. In the preferred embodiment of the present invention, the tilt mechanism 60 is positioned along the front 20 of the base 18 when the swivel member 22 is in its "normal" swivel position shown in FIG. 17a.

The tilt mechanism 60 includes a tilt support extension 66 extending from the swivel member 22, and in the preferred embodiment of the support structure of the present invention the swivel member 22 and the tilt support extension 66 are fabricated as a single casting. The tilt support extension 66 projects forwardly from the swivel member annular portion 24, and is provided with elongate torsion spring elements 68 and means for securing a mid-portion 70 of each of the spring elements 68 (i.e. a portion 70 mid-length an elongate torsion spring element 68) to the tilt support extension 66 (and hence to the swivel member 22) with the torsion spring elements 68 horizontally extending along the front 20 of the base 18 when the swivel member 22 is in its normal position.

The spring elements 68 are preferably elongate strips or bars of high yield strength steel (e.g. Type 1095 polished spring steel). In one example of a torsion element 68 having a length 1 of approximately 10 inches, the bar's width w is approximately ⅜ inch and the bar's thickness or depth d is approximately 0.05 inch, and three such bars 68 are stacked along their width/length surfaces.

Figure 5:
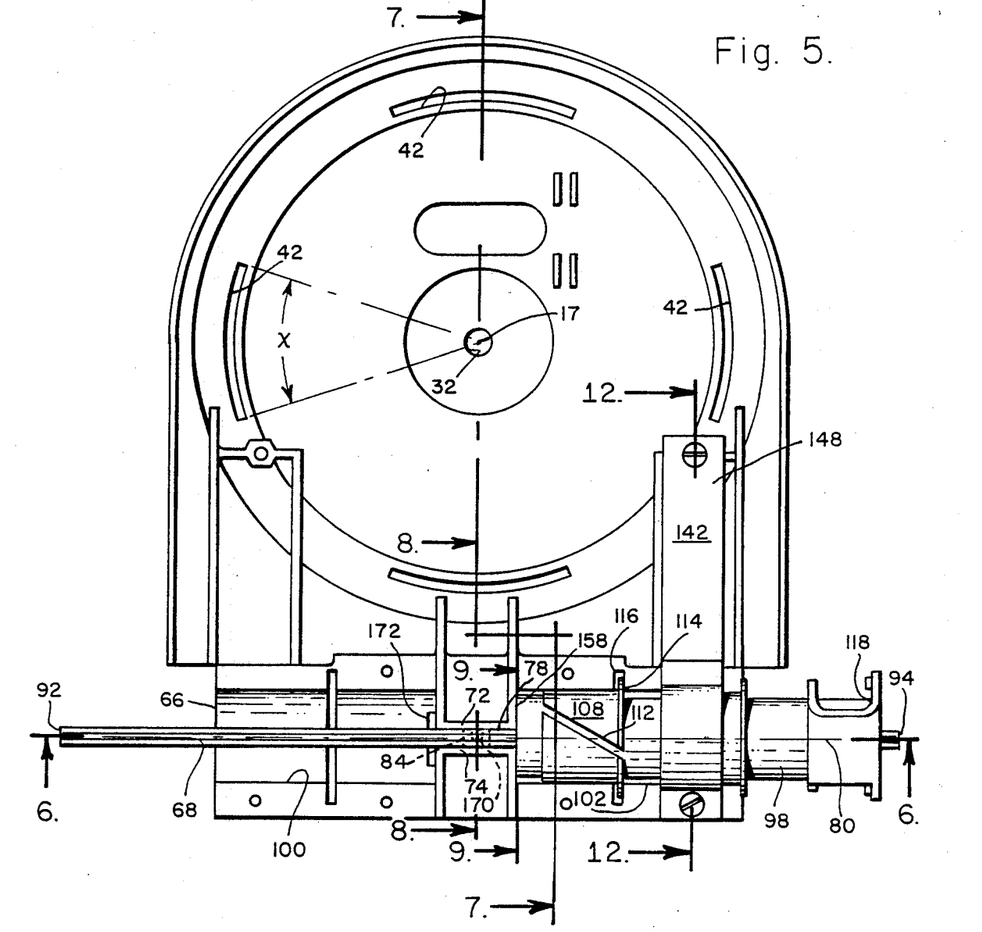
FIG. 5 is a top plan view of the swivel member of the preferred embodiment of the present invention, shown with the tilt mechanism in place but with some components removed for clarity of description.

The tilt support extension 66 includes a pair of vertically extending obverse parallel walls 72, 74, situated mid-length along the tilt support extension 66, as shown in FIG. 5. The walls 72, 74 have a height equal to the width w of the torsion bars 68, and the vertical walls 72, 74 with the horizontally extending floor 76 therebetween results in a channel 78 into which the mid-portions 70 of the stacked torsion spring elements 68 may be inserted with their width dimension vertically disposed, and with the longitudinal axis 80 of the stack of torsion bars 68 horizontally extending (i.e. with the spring elements length dimension horizontally disposed).

Figure 6:
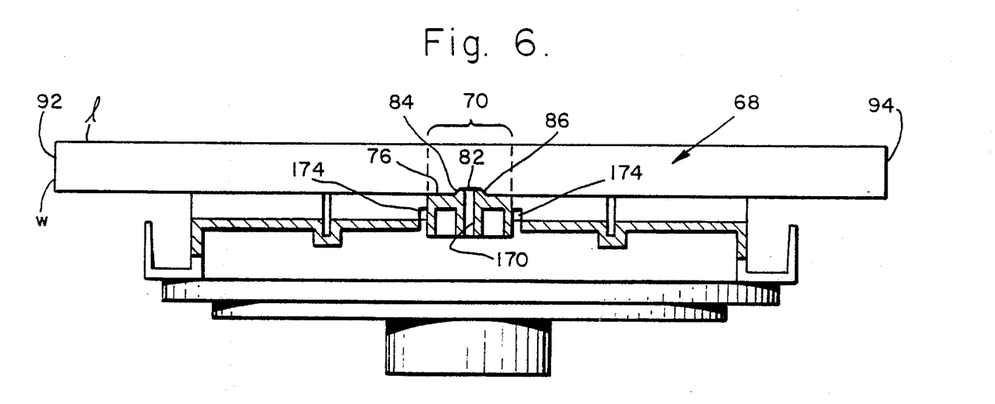
FIG. 6 is a cross-sectional view of the swivel member of FIG. 5 taken along the line 6—6 in the direction of the appended arrows, but without the tilt mechanism components shown in the right-hand half portion of FIG. 5.
Figure 11:
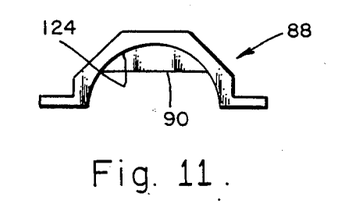
FIG. 11 is an end view of a cap member shown in FIG. 4 which, in cooperation with the swivel member, couples operative portions of the tilt apparatus to the swivel member.

Each of the elongate bars 68 includes a bottom notch 82 mid-length the bar 68, for mating with an upward projection 84 on the floor 76 of the channel 78 mid-length the walls (see FIG. 6). A cap 88 (shown in FIGS. 4 and 11, to be described in greater detail later) is secured to the tilt support extension 66 and includes a flat inner surface portion 90 of the same length as the walls 72, 74, and is positioned thereupon to retain the mid-portions 70 of the torsion bars 68 secured to the tilt support extension 66 (and hence to the swivel member 22) with the torsion bars mid-portions 70 prevented from rotating about the longitudinal axis 80 with respect to the swivel member 22. The length of the constrained torsion bars mid-portions 70 is equal to the length of the pair of walls 72, 74, one example of which is one inch.

Figure 10:
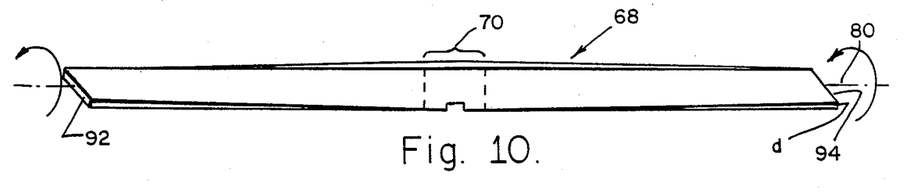
FIG. 10 is a perspective view of a elongate torsion spring member of the tilt apparatus, indicating rotation of the member's ends about its longitudinal axis and with respect to its mid-portion.

The ends 92, 94 of the torsion bars 68 are rotatable about the longitudinal axis 80 with respect to the bars' constrained mid-portions 70. As will be explained later, the present invention includes means for coupling the CRT device or computer monitor to the ends 92, 94 of the torsion bars 68 with the ends 92, 94 being rotatably displaced about the longitudinal axis 80 for counterbalancing the mounted CRT and when the CRT is manually urged for changing tilt position. FIG. 10 is illustrative of the manner by which the ends 92, 94 of a torsion bar 68 are caused to rotate about the longitudinal axis 80 with respect to its vertically fixed mid-portion 70.

Computer monitors are known to have been counterbalanced by the use of leaf springs or elongate torsion bars, wherein one end of the bar is fixed or constrained against rotation while the other end (to which is coupled the computer monitor) is rotatable about the bar's longitudinal axis. By means of the leaf spring or elongate torsion bar 68 utilized in the preferred embodiment of the present invention, wherein both ends 92, 94 (to which is coupled the computer monitor) are together rotatable about a mid-portion 70 which is fixed or constrained against rotation, the resultant spring force available for counterbalancing the monitor is significantly greater than if a fixed-end torsion bar of the same dimensions were utilized. By fixing a torsion bar at its mid-portion rather than at one of its ends, a torsion bar having a lesser width than is possible for a fixed-end bar of the same length, may be utilized in computer monitor counterbalancing applications. In addition, available spring force of the mid-portion constrained torsion bars 68 is further significantly increased by the utilization of a plurality of such bars in stacked configuration which also reduces the maximum stress in the spring material.

Turning to FIGS. 4, 5, 7 and 13, a pair of tubes or hollow cylinders 96, 98 are rotatably supported upon corresponding semicylindrical surfaces 100, 102 longitudinally extending along the tilt support extension 66. The cylinders 96, 98 longitudinally house respective portions of the torsion bars 68 from the vicinity of their ends 92, 94 toward but not including their mid-portions 70. For example, the second cylinder 102 houses a portion of each torsion bar 68 from the vicinity of its end 94 to the right-hand boundary of the torsion bar's mid-portion 70 (i.e. the right-hand entrance of the channel 78 as viewed in FIG. 5), while the first cylinder 96 houses the portion of the torsion bar 68 extending from the vicinity of its end 92 to the left-hand boundary of the bar's mid-portion 70 (i.e. the left-hand entrance of the channel 78 as viewed in FIG. 5). It will be observed that the first cylindrical housing 96 and its cooperating parts are not shown in FIG. 5, for clarity of description, and it should be recognized that the discussion herein involving the second cylindrical housing 98 and its cooperating parts is equally applicable to the first cylindrical housing 96 and its cooperating parts.

The first cylindrical housing 96 is rotatable about the longitudinal axis 80 within plastic (e.g. Nylon) bushings 104, 106 retained upon the semicylindrical surface 100 of the tilt support extension 66, and the second cylindrical housing 98 is rotatable about the longitudinal axis 80 within plastic (e.g. Nylon) bushings 108, 110 retained upon the second semicylindrical surface 102 of the tilt support extension 66. Each of the bushings 104, 106, 108, 110 contain a slot (for example, slot 112 of bushing 108 in FIG. 5), to allow for bushing diameter adjustment as may be necessary. Each of the bushings 104, 106, 108, 110 include a vertical side flange 114 for assisting in positioning the bushings along the cylinders 96, 98, and the flange 114 of the inner bushings 106, 108 are situated within a channel 116 of the tilt support extension 66 for retaining these inner bushings 106, 108 against longitudinal displacement. A downwardly extending projection (not shown) on each bushing 104, 106, 108, 110 cooperates with a corresponding depression (not shown) in the tilt support extension 66 for precluding rotation of the bushings 104, 106, 108, 110 about the longitudinal axis 80.

A first end plate 118 is rigidly attached to the one end of the first cylindrical housing 96 remote from the bars' mid-portions 70, and a second end plate 120 is rigidly attached to the one end of the second cylindrical housing 98 remote from the bars' mid-portions 70. Each of the end plates 118, 120 contain a rectangular aperture therein (e.g. the rectangular aperture 122 of the end plate 120 shown in FIG. 4) which conforms to the cross-sectional outline of the stack of torsion bars 68. The torsion bars 68 extend through the rectangular apertures 122 of each end plate 118, 120 in the vicinity of the bars' ends 92, 94.

Figure 8:
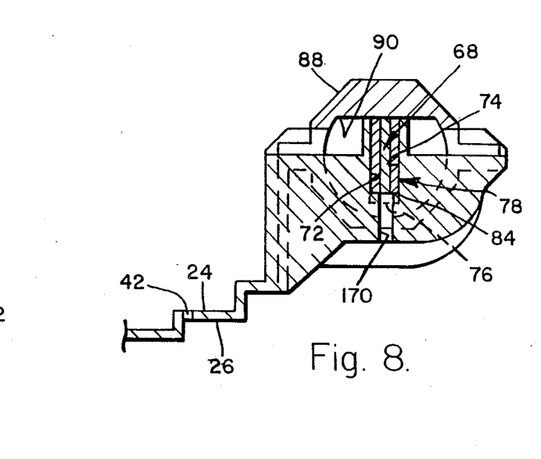
FIG. 8 is a cross-sectional view of the tilt apparatus and a fragment of the swivel member of FIG. 5 taken along the line 8—8 in the direction of the appended arrows.

As previously mentioned, the cap 88 (see FIGS. 4, 8 and 11) is affixed to the tilt support extension 66 with its flat inner surface portion 90 retaining the torsion bars' mid-portions 70 within the channel 78. The cap 88 also includes semicylindrical inner surface portions 124 on either side of the flat inner portion 90, which contact the bushings 106, 108 for rotatably retaining the installed cylindrical housings 96, 98. Accordingly, the cylindrical housings 96, 98 are rotatably coupled about their common longitudinal axis 80 to the swivel member 22 and are further secured to the torsion bars 68 in the vicinity of the torsion bars' ends 92, 94.

Figure 3:
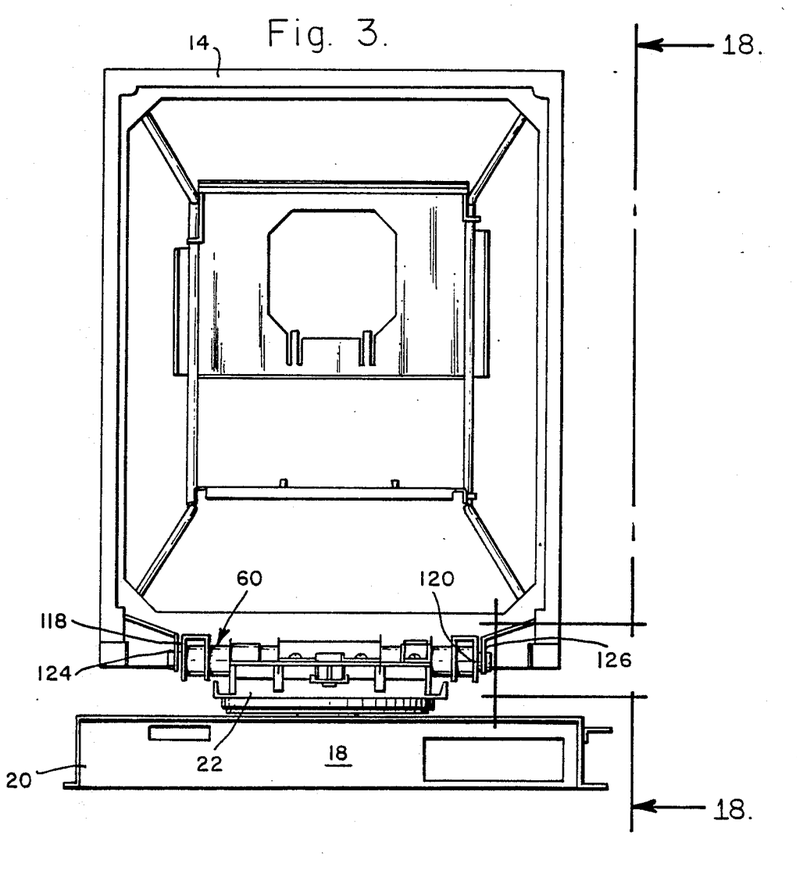
FIG. 3 is a front view of the support structure of the preferred embodiment of the present invention.
Figure 18A:
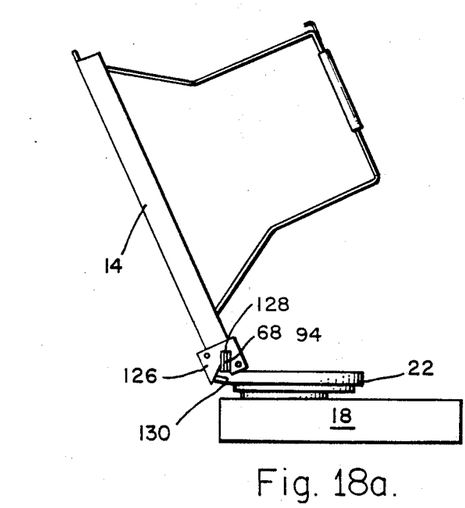
FIGS. 18a–c are a series of side elevation views of the structure of FIG. 3 taken along the line 18—18 in the direction of the appended arrows, showing the manner by which the video display frame is mounted to the swivel/tilt apparatus of the present invention and further indicating the permissible and useful ranges through which the display device may be tilted by such apparatus.

As previously described with respect to FIGS. 1 and 3, the CRT display device 10 is mounted to the frame 14 in conventional manner. Referring to FIGS. 3, 4 and 18a, the frame 14 includes a pair of mounting plates 124, 126 for mounting the frame to the tilt mechanism 60 of the present invention.

The right-hand mounting plate 126 (as viewed in FIG. 3) is shown in greater detail in FIGS. 4 and 18a; it will be observed that the left-hand mounting plate 124 (as viewed in FIG. 3) is not shown in FIG. 4, and it should be recognized that the discussion herein concerning the right-hand mounting plate 126 is equally applicable to the left-hand mounting plate 124.

Each of the mounting plates 124, 126 are rigidly attached to the frame 14 such that when the horizontal or width dimension of the display screen 12 of the CRT display device 10 (which in use is attached to the frame 14) is parallel to the longitudinal axis 80, the left mounting plate 124 is parallel to the left end plate 118 and the right mounting plate 126 is parallel to the right end plate 120. The mounting plates 124, 126 are situated along the front bottom of the frame 14 and are separated by a distance such that their obverse or facing inner surfaces respectively contact the outer surfaces of the left and right end plates 118, 120. Each of the mounting plates 124, 126 contain a slotted aperture 128 generally conforming to the cross-sectional outline of the stacked torsion bars 68 and having a widened bottom opening 130. When the frame 14 is forwardly tilted from vertical as shown in FIG. 18a, the slotted aperture 128 is vertically oriented corresponding to the vertical orientation of the width dimension of the torsion bars 68. When mounting the frame 14 to the tilt mechanism 60, the frame is lowered in the forwardly tilted position with the stacked torsion bars 68 introduced into the slotted aperture 128 of the mounting plates 124, 126 in the vicinity of the bars' respective ends 92, 94. The right mounting plate 126 is thereupon affixed to the right end plate 120 by securing bolts (not shown) through mounting plate apertures 132, 134 and mating end plate threaded apertures 136, 138, respectively; the left-hand mounting plate 124 is similarly affixed to the left-hand end plate 118.

Figure 12:
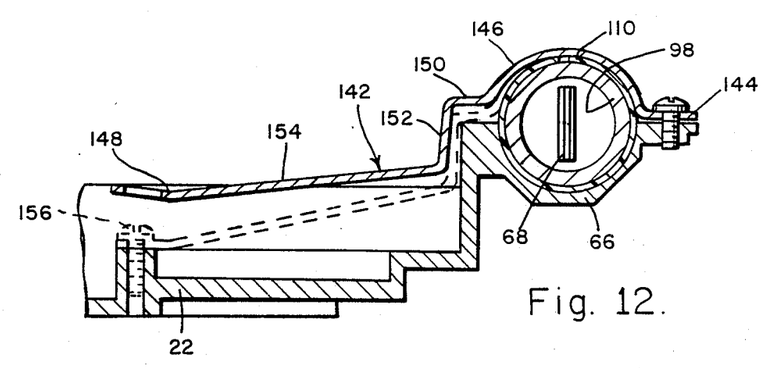
FIG. 12 is a cross-sectional view of the tilt impeding friction mechanism of the preferred embodiment of the present invention taken along the line 12—12 of FIG. 5 in the direction of the appended arrows.
Figure 13:
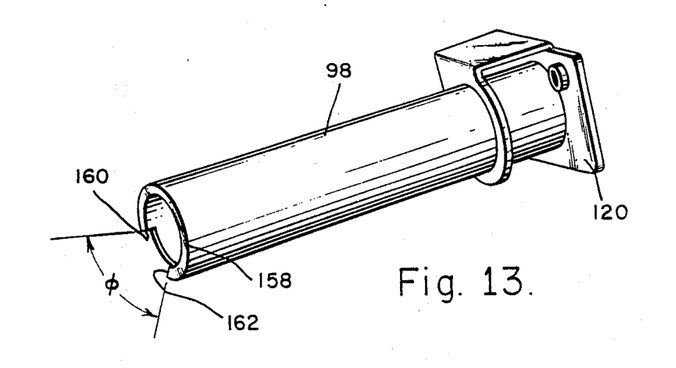
FIG. 13 is a perspective view of one of the cylinders which house the spring members.

It can be appreciated that rotation of the frame 14 about the longitudinal axis 80 will cause corresponding rotation of the cylindrical housings 96, 98 and accordingly corresponding rotation of the ends 92, 94 of the stacked torsion bars 68 with respect to their fixed mid-portions 70, operating to counterbalance the CRT display device 10 mounted to the frame 14. The invention further includes means for providing resistance in the cylinders 96, 98 to rotation about the longitudinal axis 80 for maintaining counterbalanced position of the mounted display device 10, by controllably introducing friction into the tilt mechanism which must be overcome to change tilt position Specifically, as illustrated in FIGS. 4, 5 and 12, each of a pair of spring clamps 140, 142 is affixed at one end 144 to the tilt support extension 66 and has a semicylindrical portion 146 for resiliently clamping respective outer plastic bushings 104, 110 against the cylindrical housings 96, 98 when each clamp's other end 148 is secured to the swivel member 22; see in particular FIG. 12. Each of the spring clamps 140, 142 is preferably a strip of high yield strength steel, and the clamping force exerted by the semicylindrical portion 146 is resiliently provided by the spring arm implemented by the strip segments 150, 152, 154 extending from the semicylindrical portion 146 to the strip's left end 148 (as viewed in FIG. 12). When the screws 156 at the ends 148 are seated for flexing the spring arm segments 154 (as shown by the dashed lines in FIG. 12), the resilient clamping force applied to the bushings 140, 142 results in a frictional drag force applied to the cylindrical housings 96, 98 for impeding rotation of the cylinders (and hence of the mounted display device 10) until the drag force is overcome by the extent of the manual urging applied to the device 10 by the operator. Upon cessation of the manual urging, rotation of the cylindrical housings 96, 98 (and hence of the mounted display device 10) ceases and the device 10 remains in its new tilt position until again urged to the extent of overcoming the drag force.

The magnitude of the drag force, and hence the dimensions of the cantilever type clamp 142 and the extent of its flexing, are determined by the amount of manual urging desired for causing movement of the mounted device 10 from its counterbalanced position. In one example of a suitable clamp using 0.062 inch thick by 0.80 inch wide Type 301 stainless steel strip with a semicylindrical portion 146 having a 0.547 inch radius, strip segments 150, 152, 154 were approximately 0.0375 inch, 0.0625 inch and 2.5 inches, respectively, and the vertical distance from the segment 150 to the flexed clamp's secured end 148 being approximately 1.125 inches.

In order to preclude the torsion bars 66 from being overstressed, or strained beyond their elastic limit and permanently damaged, means are provided for limiting rotation of the bars' ends 92, 94 in each direction about the longitudinal axis 80. In the preferred embodiment of the invention, such limitation is implemented by stop means cooperating with the cylindrical housings 96, 98 for limiting rotation of the housings 96, 98 in each direction about the longitudinal axis 80.

Specifically, turning to FIGS. 4, 6, 9 and 13, the stop means for limiting rotation of the cylinders 96, 98 is situated at the ends of each cylinder 96, 98 in the vicinity of the torsion bars mid-portions 70. To avoid redundancy of description, the stop means will be described with respect to the one cylindrical housing 98, it being understood that the same description is applicable to the other cylindrical housing 96.

Accordingly, the end 158 of the cylinder 98 in the vicinity of the torsion bars mid-portions 70 includes a cutout resulting in two radial stop surfaces 160, 162 facing each other and separated by an arc $\phi$. A stop member 164 is secured to the underside of the tilt support extension 66 in the vicinity of the torsion bars mid-portions 70, for example by means of a screw 166 disposed through an aperture 168 in the stop member 164 (FIG. 4) and secured to threaded bore 170 in the tilt support extension 66 (FIG. 6). The stop member 164 includes a pair of upwardly projecting walls 172 extending through slits 174 respectively on either side of the left and right entrances of the channel 78; see also FIG. 5. Each of the upstanding walls includes an arcuate upper surface 176 of arc $\chi$ and preferably having the same radius as the inner radius of the cylindrical housings 96, 98, terminating in the first radial stop surface 178 and a second radial stop surface 180.

Figure 9A:
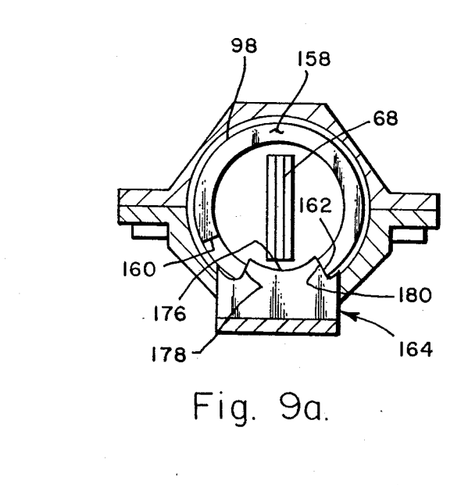
FIG. 9a is a cross-sectional view of the tilt apparatus shown in FIG. 5 taken along the line 9—9 in the direction of the appended arrows, showing the tilt limiting apparatus of the preferred embodiment of the present invention in its maximum forward tilt position.
Figure 9B:
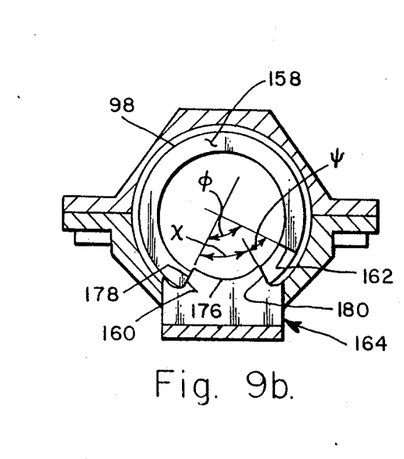
FIG. 9b shows the tilt limiting mechanism of FIG. 9a in its maximum backward tilt position.
Figure 18B:
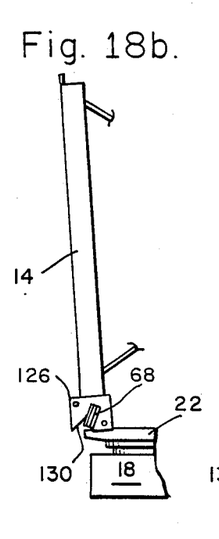
Figure 18C:
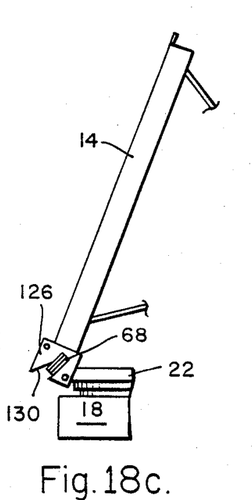

FIG. 9 is illustrative of operation of the stop means for limiting tilt. In FIG. 9a, the cylindrical housing 98 is shown in its extreme clockwise position corresponding to the limit of forward tilt of the frame 14 as illustrated in FIG. 18b. As viewed in FIG. 9a, the cylinder right radial stop surface 162 is in contact with the stop member right radial stop surface 180, precluding further clockwise rotation of the cylindrical housing 98 about the longitudinal axis 80. In FIG. 9b (wherein components unnecessary to this discussion are omitted) the cylindrical housing 98 is shown in its extreme counterclockwise position, corresponding to the limit of backward tilt of the frame 14 as illustrated in FIG. 18c. As viewed in FIG. 9b, the cylinder left radial stop surface 160 is in contact with the stop member left radial stop surface 178, precluding further counterclockwise rotation of the cylindrical housing 98.

Accordingly, it may be appreciated that the cylindrical housing 96, 98 may be rotated through a rotational angle $\psi$ which is equal to the difference between the angles $\phi$ and $\chi$. In the example previously mentioned, the arc $\phi$ between cylinder stop surfaces 160, 162 is 90°, the arc $\chi$ between the stop member first and second stop surfaces 178, 180 is 65°, and accordingly, the angle $\psi$ of cylinder rotation for frame tilt is 25°.

The frame 14 is initially installed on the tilt-swivel apparatus of the present invention when the torsion bars 68 are in their unstrained condition, i.e. when the width dimension of the torsion bars 68 is vertically oriented throughout the length of the bars. Since the width dimension of the torsion bars mid-portions 70 is vertically oriented as installed, the width dimension of the bars ends 94 is correspondingly vertically oriented as shown in FIG. 18a. The frame 14 is attached to the mounting plates 124, 126 such that the slotted apertures 128 are vertically oriented when the frame is tilted forward by, say, 25° from the vertical axis. During assembly, as previously discussed, the frame 14 is lowered onto the stack of torsion bars 68 in the vicinity of their ends 92, 94 by mean of the mounting plates' slotted apertures 128, and the mounting plates 124, 126 are secured to the cylindrical housings' end plates 118, 120. The weight of the frame 14 with its attached CRT device 10 and the location of the combination's gravitational center produces a torque which is counterbalanced by an initial elastic deformation of the torsion bars 68, effectively preloading the torsion bars 68. A suitable preload angle may correspond to an initial rotation of the torsion bars ends 92, 94 of approximately 20°, so that the frame 14 is tilted approximately 5° forward from vertical, as shown in FIG. 18b. For a particular CRT and frame combination of known weight and center of gravity the physical characteristics of the torsion bars 68 for implementing this or other preload angles may be ascertained by persons of ordinary skill in the pertinent art.

In the previously described example, the limited range of tilt travel is −5° (i.e. 5° forward tilt from vertical as shown in FIG. 18b) through +20° (i.e. 20° backward tilt from vertical as shown in FIG. 18c). Between these limits the stop surfaces 160, 162 are positioned as shown in FIGS. 9a and 9b, so that during assembly the stop member 164 is inserted in the swivel member slits 174 and secured in place when the frame 14 is positioned anywhere between its active limits as shown in FIGS. 18b and 18c.

Returning to FIG. 1, tilt and swivel position of the computer monitor or CRT display device 10 may be changed by an operator, by manually urging the housing 16 in the direction appropriate to rotate the monitor about the horizontal axis 19 through the active range described with respect to FIGS. 18b and c, and/or to rotate the monitor 10 about the vertical axis 17 through the swivel range described with respect to FIGS. 17a–h.

Although the tilt and swivel apparatus of the present invention has been described with respect to a CRT display device used as a computer monitor, the apparatus of the invention is applicable as well to display devices other than CRT's and to products other than computer monitors. In certain applications it may be desirable to utilize the swivel feature of the present invention without the tilt feature, or the tilt feature without the swivel feature. In an application of the latter type, the tilt support extension 66 would be included in the base 18 since the swivel member 22 would be unnecessary. Other embodiments of the tilt and/or swivel apparatus of the present invention and modifications of the embodiment herein presented may be developed without departing from the essential characteristics thereof. Accordingly, the invention should be limited only by the scope of the claims listed below.

I claim:
1. Apparatus for adjustably tilting and swivelling a product, comprising the combination of:
a base;
a swivel member supported by said base rotatably about a vertical axis of rotation and having arcuate means extending about said vertical axis;
a bearing member interposed between said base and said swivel member and rotatable with respect to said base about said vertical axis, said bearing member including means cooperating with said arcuate means and said base such that said swivel member is rotatable with respect to said bearing member through a first predetermined angle about said vertical axis and said bearing member is rotatable with said swivel member upon rotation of said swivel member through a second predetermined angle about said vertical axis, for permitting said swivel member to be rotated with respect to said base about said vertical axis through a rotational angle equal to the sum of said first and second predetermined angles;
elongate torsion spring means having a longitudinal axis and means securing a portion of said spring means to said swivel member with said longitudinal axis horizontally extending and for preventing rotation with respect to said swivel member of said portion about said longitudinal axis, said portion being approximately mid-length said spring means;
coupling means coupled to said swivel member and to the ends of said spring means, said coupling means being rotatable about said longitudinal axis with said ends rotating about said longitudinal axis in response to rotation of said coupling means;
mounting means for mounting the product to said coupling means such that externally urging the mounted product for rotation about said longitudinal axis for changing tilt position of the product will cause said coupling means to correspondingly rotate about said longitudinal axis, and externally urging the product for rotation about said vertical axis for changing swivel position of said product will cause said swivel member to correspondingly rotate about said vertical axis;
resistance means cooperating with said coupling means for providing resistance in said coupling means to rotation about said longitudinal axis; and
stop means cooperating with said coupling means and said swivel member for limiting rotation of said coupling means in each direction about said longitudinal axis.

2. The apparatus according to claim 1, above, further including in combination said product mounted by said mounting means to said coupling means.

3. The apparatus according to claim 1, above, wherein the sum of said first and second predetermined angles is greater than 360°.

4. The apparatus according to claim 1, above, wherein said second predetermined angle is less than 360° and said first predetermined angle is at least equal to the difference between 360° and said second predetermined angle.

5. The apparatus according to claim 1, above, wherein said bearing member means cooperating includes stop means cooperating with said base for limiting rotation of said bearing member about said vertical axis to said second predetermined angle.

6. The apparatus according to claim 1, above, wherein said bearing member means cooperating includes stop means cooperating with said base and further includes means engaging said arcuate means, for limiting rotation of said swivel member about said vertical axis to the sum of said first and second predetermined angles.

7. The apparatus according to claim 6, above, wherein:
said arcuate means includes at least one arcuate slot in said swivel member extending through a rotational angle about said vertical axis, and
said bearing member means engaging said arcuate means includes at least one finger on said bearing member projecting through respective ones of said at least one slot.

8. The apparatus according to claim 7, above, wherein said at least one finger extends through an arc within said at least one arcuate slot substantially equal to the difference between said rotational angle of said at least one arcuate slot and said first predetermined angle.

9. The apparatus according to claim 1, above, wherein said swivel member and said bearing member are rotatable in clockwise direction and counterclockwise direction about said vertical axis.

10. The apparatus according to claim 9, above, further including stop means on said base, and wherein said bearing member means cooperating includes stop means on said bearing member cooperating with said stop means on said base for stopping clockwise rotatability of said bearing member when said bearing member has been clockwise rotated through said second predetermined angle, and for stopping counterclockwise rotatability of said bearing member when said bearing member has been counterclockwise rotated through said second predetermined angle.

11. The apparatus according to claim 9, above, further including stop means on said base, and wherein said bearing member means cooperating includes stop means on said bearing member cooperating with said stop means on said base and with said means engaging said arcuate means, for stopping clockwise rotatability of said swivel member when said swivel member has been clockwise rotated through the sum of said first and second predetermined angles and for stopping counterclockwise rotatability of said swivel member when said swivel member has been counterclockwise rotated through the sum of said first and second predetermined angles.

12. The apparatus according to claim 11, above, wherein:
said arcuate means includes a plurality of arcuate slots in said swivel member, and
said means engaging sd swivel member arcuate means includes a plurality of fingers projecting through respective ones of said slots.

13. The apparatus according to claim 12, above, wherein said arcuate slots extend through equal rotational angles about said vertical axis.

14. The apparatus according to claim 12, above, wherein said arcuate slots are rotationally equally spaced about said vertical axis and said fingers are rotationally equally spaced o said bearing member.

15. The apparatus according to claim 1, above, wherein said elongate torsion spring means includes a plurality of stacked elongate torsion spring members of substantially equal lengths.

16. The apparatus according to claim 1, above, wherein said elongate torsion spring means includes a plurality of stacked elongate torsion spring members of substantially equal lengths and equal widths.

17. The apparatus according to claim 1, above, wherein said elongate torsion spring means includes a plurality of stacked elongate torsion spring members of substantially equal lengths and equal widths and equal depths.

18. The apparatus according to claim 1, above, wherein said coupling means includes cylinder means for housing respective portions of said spring means in the vicinity of said ends longitudinally within said cylinder means, said cylinder means coupled rotatably about said longitudinal axis to said swivel member and including means securing thereto said spring means in the vicinity of said ends.

19. The apparatus according to claim 18, above, wherein said resistance means includes friction means for impeding rotation of said cylinder means about said longitudinal axis.

20. The apparatus according to claim 19, above, wherein said friction means includes bushing means about said cylinder means and resilient clamp means secured to said swivel member for resiliently clamping said bushing means against said cylinder means.

21. The apparatus according to claim 1, above, wherein said coupling means includes:
a first hollow cylinder longitudinally extending from the vicinity of said secured spring means portion mid-length said spring means to the vicinity of one of said ends of said spring means; and
a second hollow cylinder longitudinally extending from the vicinity of said spring means secured portion mid-length said spring means to the vicinity of the other of said ends of said spring means.

22. The apparatus according to claim 21, above, wherein said stop means includes a stop member secured to said swivel member and cooperating with respective ends of said first and second cylinders in the vicinity of said secured spring means portion approximately mid-length said spring means, for limiting rotation of said first and second cylinders in each direction about said longitudinal axis.

23. The apparatus according to claim 21, above, wherein said resistance means includes friction means for impeding rotation of said first and second cylinders.

24. The apparatus according to claim 23, above, wherein said friction means includes:

a first bushing about said first cylinder and a first resilient clamp member secured to said swivel member for resiliently clamping said first bushing against said first cylinder; and a second bushing about said second cylinder and a second resilient clamp member secured to said swivel member for resiliently clamping said second bushing against said second cylinder 25. The apparatus according to claim 1, 3, 4, 5, 6, 7, 8, 9, 10, 11, 12, 13, 14, 15, 16, 17, 18, 19, 20, 21, 22, 23 or 24, above, further including said product in combination, said product being a display device having a display screen and wherein said display device is mounted by said mounting means to said coupling means with said screen parallel to said longitudinal axis.

26. Apparatus for adjustably swivelling a product, comprising the combination of:
a swivel member having arcuate means extending about an axis of rotation;
a base for supporting said swivel member and for permitting said member to rotate with respect to said base about said axis;
a bearing member interposed between said swivel member and said base and rotatable with respect to said base about said axis, said bearing member including means cooperating with said arcuate means and said base such that said swivel member is rotatable with respect to said bearing member through a first predetermined angle about said axis and said bearing member is rotatable with said swivel member upon rotation of said swivel member through a second predetermined angle about said axis, for permitting said swivel member to be rotated with respect to said base about said axis through a rotational angle equal to the sum of said first and second predetermined angles; and
mounting means for mounting the product to said swivel member.

27. The apparatus according to claim 26, above, further including in combination said product mounted by said mounting means to said swivel member.

28. The apparatus according to claim 27, above, wherein said product is a display device.

29. The apparatus according to claim 26, above, wherein said swivel member includes tilt means for adjustably tilting the product with respect to said axis when the product is mounted thereto.

30. The apparatus according to claim 29, above, further including in combination said product mounted by said mounting means to said tilt means, said product being a display device.

31. The apparatus according to claim 26, above, wherein said bearing member means cooperating includes stop means cooperating with said base for limiting rotation of said bearing member about said axis to said second predetermined angle.

32. The apparatus according to claim 26, above, further including stop means on said base, and wherein said bearing member means cooperating includes stop means on said bearing member cooperating with said stop means on said base and with said means engaging said arcuate means, for limiting rotation of said swivel member about said axis to the sum of said first and second predetermined angles.

33. The apparatus according to claim 32, above, wherein:

said arcuate means includes at least one arcuate slot in said swivel member extending through a rotational angle about said axis, and
said bearing member means engaging said arcuate means includes at least one finger on said bearing member projecting through respective ones of said at least one slot.

34. The apparatus according to claim 33, above, wherein said at least one finger extends through an arc within said at least one arcuate slot substantially equal to the difference between said rotational angle of said at least one arcuate slot and said first predetermined angle.

35. The apparatus according to claim 26, above, wherein said swivel member and said bearing member are rotatable in clockwise direction and counterclockwise direction about said axis.

36. The apparatus according to claim 35, above, further including stop means on said base, and wherein said bearing member means cooperating includes stop means on said bearing member cooperating with said stop means on said base for stopping clockwise rotatability of said bearing member when said bearing member has been clockwise rotated through said second predetermined angle, and for stopping counterclockwise rotatability of said bearing member when said bearing member has been counterclockwise rotated through said second predetermined angle.

37. The apparatus according to claim 35, above, further including stop means on said base, and wherein said bearing member means cooperating includes stop means on said bearing member cooperating with said stop means on said base and with said means engaging said arcuate means, for stopping clockwise rotatability of said swivel member when said swivel member has been clockwise rotated through the sum of said first and second predetermined angles, and for stopping counterclockwise rotatability of said swivel member when said swivel member has been counterclockwise rotated through the sum of said first and second predetermined angles.

38. The apparatus according to claim 36, above, wherein:
said arcuate means includes a plurality of arcuate slots in said swivel member, and
said means engaging said swivel member arcuate means includes a plurality of fingers projecting through respective ones of said slots.

39. The apparatus according to claim 38, above, wherein said arcuate slots extend through equal rotational angles about said axis.

40. The apparatus according to claim 38, above, wherein said arcuate slots are rotationally equally spaced about said axis and said fingers are rotationally equally spaced on said bearing member.

41. Apparatus for adjustably swivelling a product, comprising the combination of:
a swivel member having a plurality of spaced arcuate slots about the same axis of rotation;
a base for supporting said swivel member and for permitting said swivel member to rotate with respect to said base about said axis;
a bearing ring interposed between said swivel member and said base, said swivel member being rotatable about said axis with respect to said ring and said ring being rotatable about said axis with respect to said base, said ring including spaced fingers respectively projecting through said slots for limiting rotatability of said swivel member with respect to said ring to a first predetermined rotational angle about said axis, said ring further including a stop for cooperating with said base for limiting rotatability of said ring with respect to said base to a second predetermined rotational angle about said axis; and mounting means for mounting the product to said swivel member.

42. The apparatus according to claim 41, above, further including in combination said product mounted by said mounting means to said swivel member.

43. The apparatus according to claim 42, above, wherein said product is a display device.

44. The apparatus according to claim 41, above, wherein said swivel member includes tilt means for adjustably tilting the product with respect to said axis when the product is mounted thereto.

45. The apparatus according to claim 44, above, further including in combination said product mounted by said mounting means to said tilt means, said product being a display device having a display screen.

46. The apparatus according to claim 41, above, including means for capturing said fingers in said slots and said swivel member being rotatable with respect to said captured fingers in either rotational direction along said slots.

47. The apparatus according to claim 46, above, said ring being rotatable by said swivel member about said axis when rotatability of said ring is not stopped by said stop means and at least one of said fingers are engaged by the trailing end of said slots.

48. The apparatus according to claim 47, above, said swivel member being rotatable with respect to said ring when said fingers are not engaged by the trailing end of said slots.

49. The apparatus according to claim 48, above, wherein said arcuate slots are of equal rotational angles about said axis.

50. The apparatus according to claim 26, 27, 28, 29, 30, 31, 32, 33, 34, 35, 36, 37, 38, 39, 40, 41, 42, 43, 44, 45, 46, 47, 48 or 49, above, wherein the sum of said first and second predetermined angles is greater than 360°.

51. The apparatus according to claim 26, 27, 28, 29, 30, 31, 32, 33, 34, 35, 36, 37, 38, 39, 40, 41, 42, 43, 44, 45, 46, 47, 48 or 49, above, wherein said second predetermined angle is less than 360° and said first predetermined angle is at least equal to the difference between 360° and said second predetermined angle.

52. Apparatus for adjustably tilting a product, comprising the combination of:
a base;
elongate torsion spring means having a longitudinal axis;
means securing a portion of said spring means to said base and for preventing rotation with respect to said base of said portion about said axis, said portion being approximately mid-length said spring means;
coupling means coupled to said base and to the ends of said spring means, said coupling means being rotatable about said axis with said ends rotating about said axis in response to rotation of said coupling means;
mounting means for mounting the product to said coupling means such that externally urging the mounted product for rotation about said axis will cause said coupling means to correspondingly rotate about said axis;

resistance means cooperating with said coupling means and said base for providing resistance in said coupling means to rotation about said axis; and
stop means cooperating with said coupling means in each rotational direction about said axis.

53. The apparatus according to claim 52, above, further including in combination said product mounted by said mounting means to said coupling means.

54. The apparatus according to claim 52, above, wherein said base includes swivel means for adjustably swivelling the mounted product about a vertical axis perpendicular to said longitudinal axis.

55. The apparatus according to claim 52, above, wherein said spring means is secured to said base with said axis substantially horizontal.

56. The apparatus according to claim 52, above, wherein said coupling means includes cylinder means for housing respective portions of said spring means in the vicinity of said ends longitudinally within said cylinder means, said cylinder means coupled rotatably about said longitudinal axis to said base and including means securing thereto said spring means in the vicinity of said ends.

57. The apparatus according to claims 56, above, wherein said resistance means includes friction means for impeding rotation of said cylinder means about said longitudinal axis.

58. The apparatus according to claim 57, above, wherein said friction means includes bushing means about said cylinder means and resilient clamp means secured to said base for resiliently clamping said bushing means against said cylinder means.

59. The apparatus according to claim 52, above, wherein said coupling means includes:
a first hollow cylinder longitudinally extending from the vicinity of said secured spring means portion mid-length said spring means to the vicinity of one of said ends of said spring means; and
a second hollow cylinder longitudinally extending from the vicinity of said secured spring means portion mid-length said spring means to the vicinity of the other of said ends of said spring means.

60. The apparatus according to claim 59, above, wherein said resistance means includes friction means for impeding rotation of said first and second cylinders.

61. The apparatus according to claim 60, above, wherein said friction means includes:
a first bushing about said first cylinder and a first resilient clamp member secured to said base for resiliently clamping said first bushing against said first cylinder; and
a second bushing about said second cylinder and a second resilient clamp member secured to said base for resiliently clamping said second bushing against said second cylinder.

62. The apparatus according to claim 59, above, wherein said stop means includes a stop member secured to said base and cooperating with respective ends of said first and second cylinders in the vicinity of said secured spring means portion approximately mid-length said spring means for limiting rotation of said first and second cylinders in each direction about said axis.

63. The apparatus according to claim 52, 54, 55, 56, 57, 58, 59, 60, 61, 62, 64, 65 or 66, above, further including said product in combination, said product being a display device having a display screen and wherein said display device is mounted by said mounting means to said coupling means with said screen parallel to said longitudinal axis.

64. The apparatus according to claim 52, above, wherein said elongate torsion spring means includes a plurality of stacked elongate torsion bars of substantially equal lengths.

65. The apparatus according to claim 52, above, wherein said elongate torsion spring means includes a plurality of stacked elongate torsion bars of substantially equal lengths and equal widths.

66. The apparatus according to claim 52, above, wherein said elongate torsion spring means includes a plurality of stacked elongate torsion bars of substantially equal lengths and equal widths and equal depths.

* * * * *